United States Patent [19]

Kobayashi et al.

[11] Patent Number: 5,070,217
[45] Date of Patent: Dec. 3, 1991

[54] COORDINATE INPUT DEVICE CAPABLE OF INDICATING A FAILURE IN A COORDINATE INDICATOR

[75] Inventors: Tadashi Kobayashi; Tetuo Kudo, both of Tokyo, Japan

[73] Assignee: NEC Corporation, Japan

[21] Appl. No.: 613,118

[22] Filed: Nov. 14, 1990

[30] Foreign Application Priority Data

Nov. 15, 1989 [JP] Japan .................................. 1-298002

[51] Int. Cl.$^5$ ............................................. G08C 21/00
[52] U.S. Cl. ........................................ 178/19; 178/18
[58] Field of Search ........................... 178/19, 18, 20; 340/706, 709

[56] References Cited

U.S. PATENT DOCUMENTS 4,717,793  1/1988  Kobagashi ............................ 178/19
4,736,073  4/1988  Abernethy ............................ 178/19

Primary Examiner—Stafford D. Schreyer
Attorney, Agent, or Firm—Laff, Whitesel, Conte & Saret

[57] ABSTRACT

In a coordinate input device including a coordinate input unit and a coordinate indicator which comprises a winding and is movable on the coordinate input unit, an oscillation generator generates an oscillation signal. Connected to the oscillation generator, a capacitor produces the oscillation signal as an output oscillation signal. When the output oscillation signal is supplied to the winding without failure, the coordinate input unit produces an electrical signal. A superposing circuit superposes the electrical signla on the output oscillation signal to produce a superposed signal. An envelope detector detects an envelope of the superposed signal to produce an envelope signal indicative of a location of the coordinate indicator on the coordinate input unit. A calculating circuit uses the envelope signal in calculating the location as a calculated location. An output oscillation detector detects the output oscillation signal to produce a detection signal. A failure monitoring circuit monitors the detection signal to produce a fault signal when the detection signal is found faulty. Preferably, a failure announcer announces a failure of the coordinate indicator in response to the fault signal.

4 Claims, 5 Drawing Sheets

COORDINATE INPUT DEVICE CAPABLE OF INDICATING A FAILURE IN A COORDINATE INDICATOR

BACKGROUND OF THE INVENTION

The present invention relates to a coordinate input device for use in indicating a location on a coordinate surface.

A coordinate input device of the type described, is disclosed in U.S. Pat. No. 4,717,793. The coordinate input device comprises a coordinate indicator and a coordinate input unit which defines the coordinate surface and which comprises a plurality of conductor loops under the coordinate surface. The coordinate indicator has a winding.

When the coordinate indicator is moved along the coordinate surface, the coordinate input device can successively sense a location of the coordinate indicator. This is done by magnetic coupling between the winding of the coordinate indicator and the conductor loops to make the coordinate indicator generate an electrical signal when the coordinate indicator is magnetically coupled with at least one of the conductor loops.

With this structure, the location of the coordinate indicator can be detected by monitoring the electrical signal because the electrical signal is generated from the coordinate indicator when the coordinate indicator approaches each of the conductor loops. The conventional coordinate input device is disadvantageous in that a failure of the coordinate indicator can not be distinguished from a failure in other components as long as the above-mentioned coordinate input unit is used. This is because the electrical signal disappears not only on the failure of the coordinate indicator but also on the failure of any other components. Thus, it is impossible to distinguish the failure of the coordinate indicator from the failure of other components in the coordinate input device when the coordinate input device is used.

SUMMARY OF THE INVENTION

It is therefore an object of the present invention to provide a coordinate input device which is capable of detecting a failure of a coordinate indicator when the coordinate input device is used.

Other object of this invention will become clear as the description proceeds.

On describing the gist of this invention, it is possible to understand that a coordinate input device is for use in indicating a location on a coordinate surface.

According to this invention, the above-understood coordinate input device comprises oscillation generating means for generating an oscillation signal, a capacitor connected to the oscillation generating means for producing the oscillation signal as an output oscillation signal, a coordinate indicator which has a winding connected to the capacitor for inducing a magnetic field, a coordinate input unit which defines the coordinate surface, on which the coordinate indicator is movable, and which comprises a plurality of conductor loops. Each conductor loop is for producing an electrical signal when magnetically coupled to the magnetic field. The above-understood coordinate input device further comprises superposing means connected to the conductor loops and the capacitor for superposing the electical signal on the output oscillation signal to produce a superposed signal, amplifying means connected to the superposing means for amplifying the superposed signal into an amplified signal, envelope detector means connected to the amplifying means for detecting an envelope of the amplified signal to produce an envelope signal indicative of the location, calculating means connected to the envelope detector means for using the envelope signal in calculating the location as a calculated location to produce a location signal representative of the calculated location, output oscillation detector means connected to the envelope detector means for detecting the output oscillation signal to produce a detection signal, and failure monitoring means connected to the output oscillation detectro means for monitoring the detection signal to produce a fault signal when the detection signal is found faulty.

DESCRIPTION OF THE PREFERRED EMBODIMENT

Figure 1:
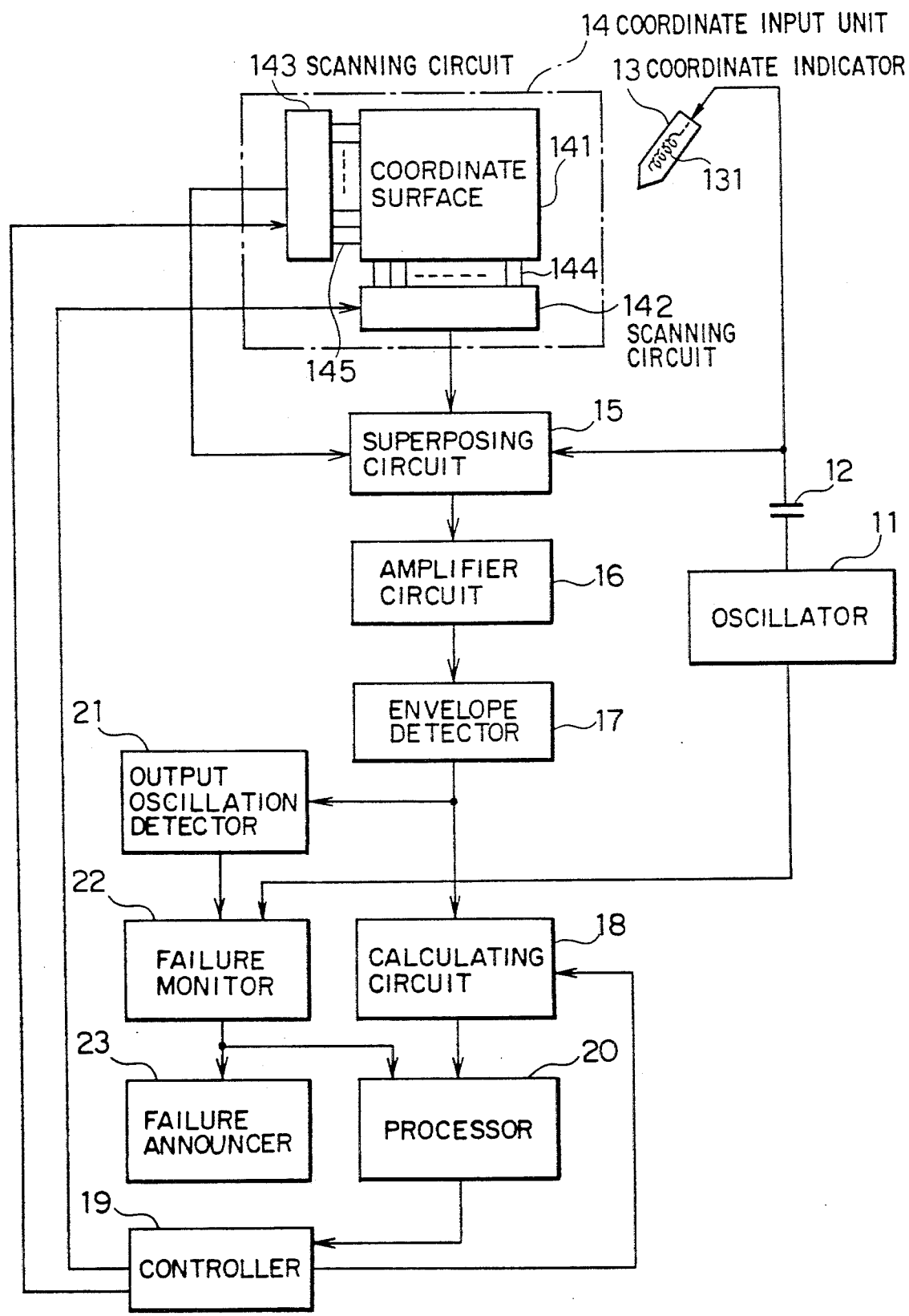
FIG. 1 is a block diagram of a coordinate input device according to an embodiment of this invention.

Referring to FIG. 1, a coordinate input device according to a preferred embodiment of this invention is for use in indicating a location on a tablet which defines a coordinate surface. The coordinate input device comprises an oscillator 11 for generating an oscillation signal which is supplied to a capacitor 12 connected to the oscillator 11. The oscillation signal has a frequency of, for example, 455 KHz. The oscillation signal is produced through the capacitor 12 as an output oscillation signal and is supplied to a coordinate indicator 13 which has a tip. The coordinate indicator 13 has a winding 131 which is connected in series to the capacitor 12 and which is supplied with the output oscillation signal from the capacitor 12 to induce a magnetic field primarily adjacent to the tip.

The coordinate input device further comprises a coordinate input unit 14 on which the coordinate indicator 13 is movable. The coordinate input unit 14 comprises a coordinate surface 141, first and second scanning circuits 142 and 143, and conductor loops 144 and 145 which are laid adjacent to the coordinate surface 141 as will presently be described in detail. Typically, the coordinate surface 141 is a plane.

Figure 2:
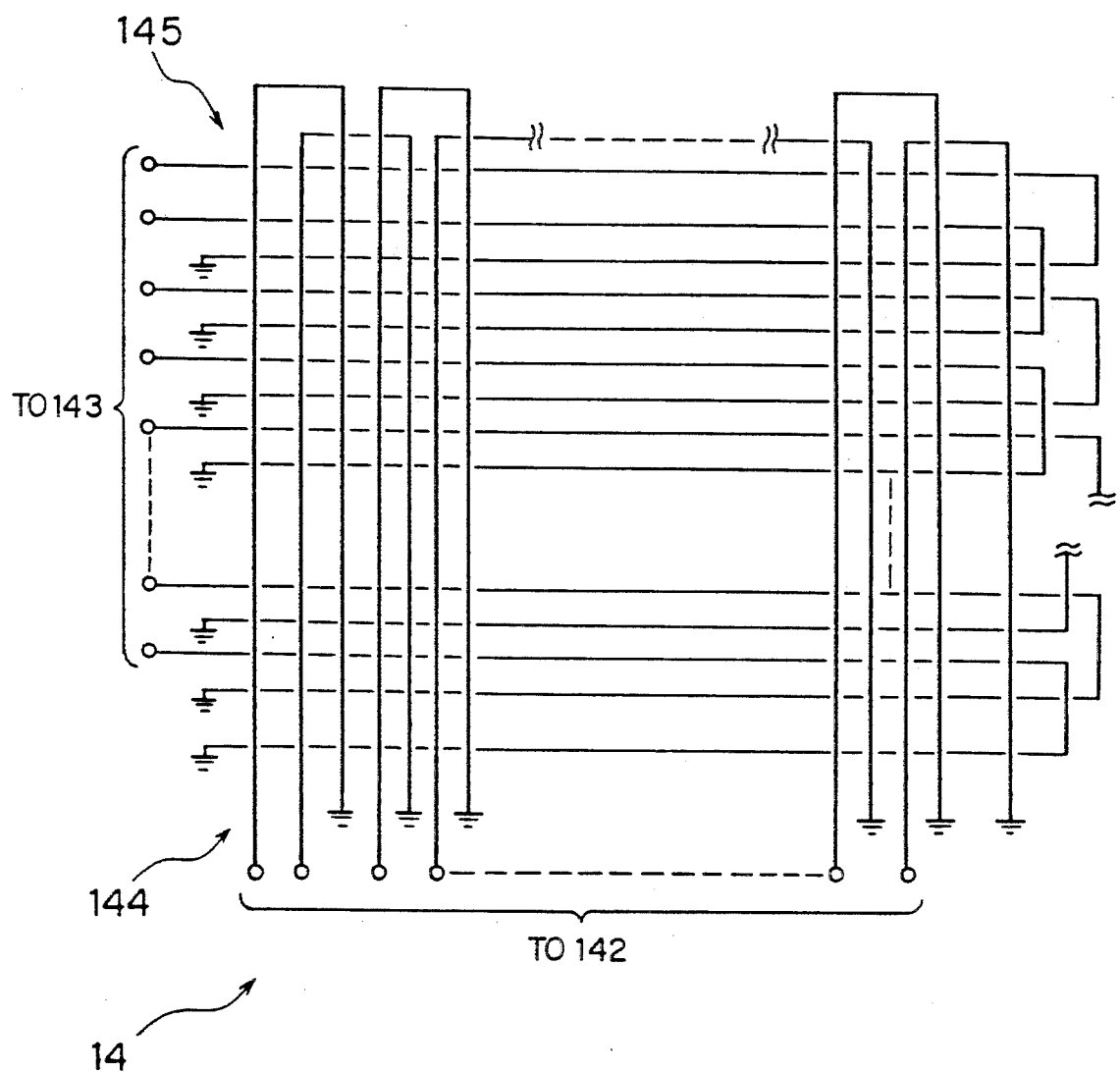
FIG. 2 is a circuit diagram of conductor loops of an input unit for use in the device illustrated in FIG. 1.

Turning temorarily to FIG. 2, the conductor loops 144 and 145 orthogonally intersect with each other and form first and second groups. The first group of conductor loops 144 is arranged along an x-axis of the coordinate surface 141 and will now be called x-axis conductor loops. The second group of conductor loops 145 is arranged along a y-axis of the coordinate surface 141 and will be referred to as y-axis conductor loops. The x-axis conductor loops 144 is successively scanned by the scanning circuit 142 one by one. The y-axis conductor loops 145 is scanned by the scanning circuit 143 in a like manner. Each of the conductor loops 144 and 145 serves to produce an electrical signal when magnetically coupled to the magnetic field.

Turning back to FIG. 1, a superposing circuit 15 is connected to the conductor loops 144 and 145 through the scanning circuits 142 and 143 and is supplied with the electrical signal from each loop 144 and 145. The superposing circuit 15 is connected furthermore to the capacitor 12 and receives the output oscillation signal. The superposing circuit 15 superposes the electrical signal on the output oscillation signal and produces a superposed signal having an envelope defined by the electrical signal. An amplifier circuit 16 is connected to the superposing circuit 15 to amplify the superposed signal into an amplified signal.

Figure 3:
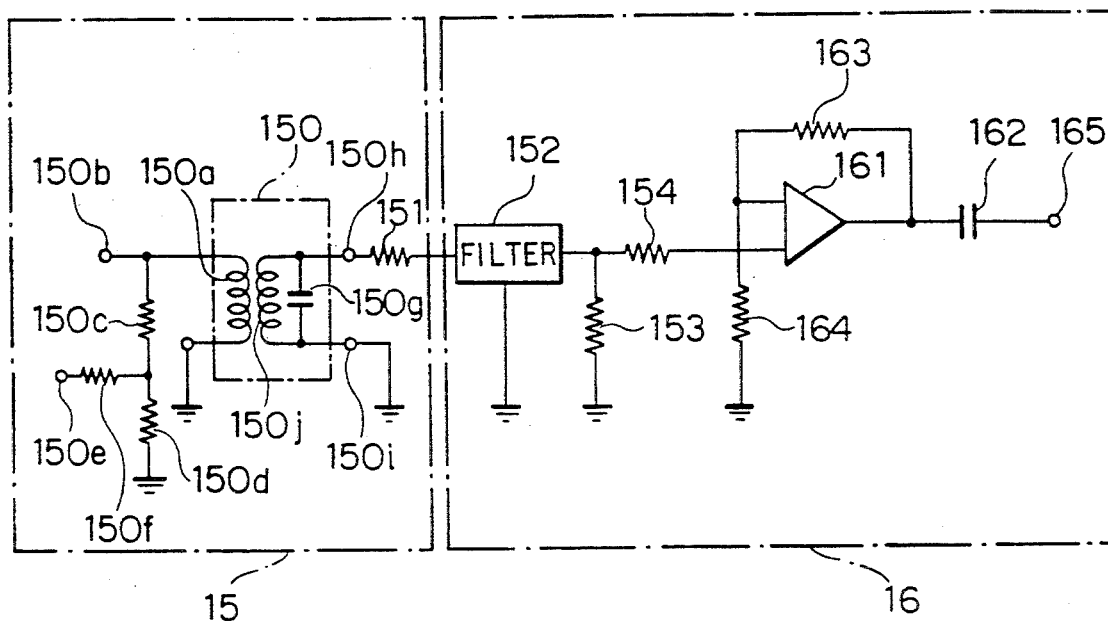
FIG. 3 is a circuit diagram of a superposing circuit and an amplifier circuit for use in the device illustrated in FIG. 1.

Turning to FIG. 3 again during a short while, a combination of the superposing circuit 15 and the amplifier circuit 16 will be described more in detail. The superposing circuit 15 comprises a transformer 150 and a filter 152. The amplifier circuit 16 comprises an amplifier 161 and a capacitor 162.

The transformer 150 comprises a primary winding 150a between a transformer input terminal 150b and ground. The electrical signal is supplied from each of the conductor loops 144 and 145 to the terminal 150b. Two resistors 150c and 150d are connected in series between the terminal 150b and ground. An output oscillation signal input terminal 150e is connected through a resistor 150f to a point of connection between the resistors 150c and 150d. A capacitor 150g is connected between two terminals 150h and 150i of a secondary winding 150j of the transformer 150.

A filter input terminal of the filter 152 is connected through a resistor 151 to the terminal 150h of the secondary winding 150j. A resistor 153 is connected between the output terminal of the filter 152 and ground. A resistor 154 is connected between the output terminal of the filter and a non-inverted input terminal of the amplifier 161. Two resistors 163 and 164 are connected in series between the output terminal of the amplifier 161 and ground. An inverted input terminal of the amplifier 161 is connected between the resistors 163 and 164. An output terminal 165 is connected through the capacitor 162 to the output terminal of the amplifier 161.

The electrical signal is supplied from the conductor loops 144 and 145 to the terminal 150b of the primary winding 150a. The output oscillation signal from the capacitor 12 is inputted to the output oscillation signal input terminal 150e.

The electrical signal is superposed on the output oscillation signal. A superposed signal is produced across the primary winding 150a. The transformer 150 produces an induced signal through the secondary winding 150j by the superposed signal. The filter 152 is supplied with the induced signal from the transformer 150 to send the induced signal to the amplifier 161 as a filter output signal. The amplifier 161 amplifies the filter output signal into an amplified signal.

Turning back to FIG. 1, an envelope detector 17 is connected to the amplifier circuit 16. The amplified signal has an envelope which shows a superposition of the electrical signal of the scanning circuit 142 or 143 on the output oscillation signal. The electrical signal gives a peak of the envelope. The envelope detector 17 detects the envelope of the amplified signal to produce an envelope signal indicative of the location where the coordinate indicator 13 points on the coordinate surface 141.

A calculation circuit 18 is connected to the envelope detector 17 and determines x and y coordinate data by calculating the envelope signal. A controller 19 is connected to the coordinate input unit 14, the calculation circuit 18, a processor 20, and the oscillator 11. For the calculation circuit 18, the controller 19 produces an origin pulse signal which is representative of an origin of the coordinate surface 141.

Figure 4:
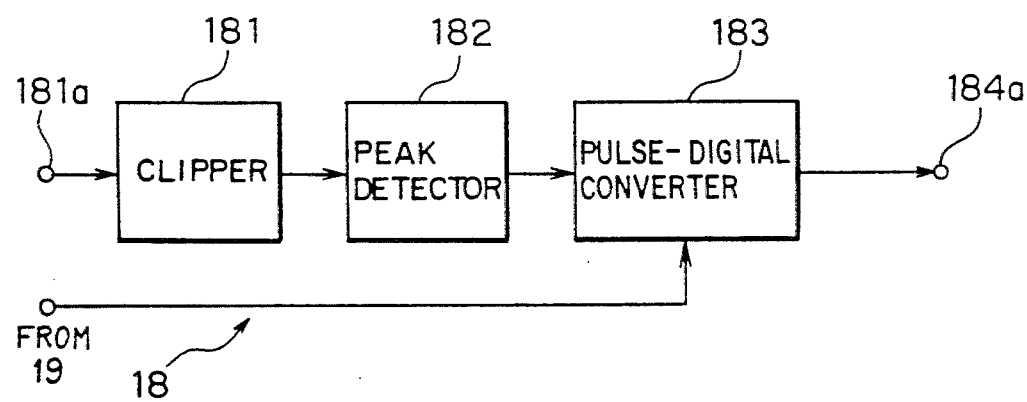
FIG. 4 is a block diagram of a calculation circuit for use in the device illustrated in FIG. 1.

Referring to FIG. 4, the calculation circuit 18 comprises a clipper 181 supplied with the envelope signal from the envelope detector 17 through an input terminal 181a. The clipper 181 has a predetermined clip level and clips the envelope signal at the predetermined clip level to supply a clipped signal to a peak detector 182. The predetermined clip level is selected in consideration of a usual peak value of the envelope signal. Specifically, the usual peak value is predicted from a maximum value of a voltage induced in each of the conductor loops due to a magnetic field produced by the coil 131 of the coordinate indicator 13. Therefore, the predetermined clip level may have a level which is somewhat higher than the usual peak value. Anyway, it is possible to remove noise from the envelope signal by clipping the envelope signal by such a clip level mentioned above. Thus, the clipper 181 serves to avoid malfunction of the peak detector 182.

The peak detector 182 detects a peak of the clipped signal to produce a peak detection pulse each time when the peak is detected. The peak detection pulse is delivered to a pulse-digital converter, namely, pulse width digitizing circuit 183 together with the origin pulse which is produced by the controller 19 in a manner to be described in detail with reference to FIG. 7. The pulse-digital converter 183 measures a time interval between a reception time instant of the origin pulse and a reception time instant of the peak detection pulse and converts the time interval into a digital value which is produced as a digital value signal. Practically, such a pulse-digital converter 183 can be realized by a combination of a reference clock generator for generating a sequence of reference clocks and a counter for counting the reference clocks for the above-mentioned time interval to produce a count as the digital value signal. If the reference clocks have a clock period equal to the scanning period of the scanning circuits 142 and 143, the count itself represents an x-coordinate value or a y-axis coordinate value of a location at which the coordinate indicator 13 is placed. The count or the digital value signal is sent through an output terminal 183a to the processor 20 and thereafter fed through an interface circuit (not shown) to an upper device (not shown also).

Turning back to FIG. 1, a processor 20 is connected to the calculation circuit 18 and is operable in the manner which will later by described. Through the output terminal 184a (FIG. 4), the location signal is supplied to the processor 20. An output oscillation detector 21 is connected to the envelope detector 17. The output oscillation detector 21 detects the output oscillation signal to produce a detection signal.

Figure 5:
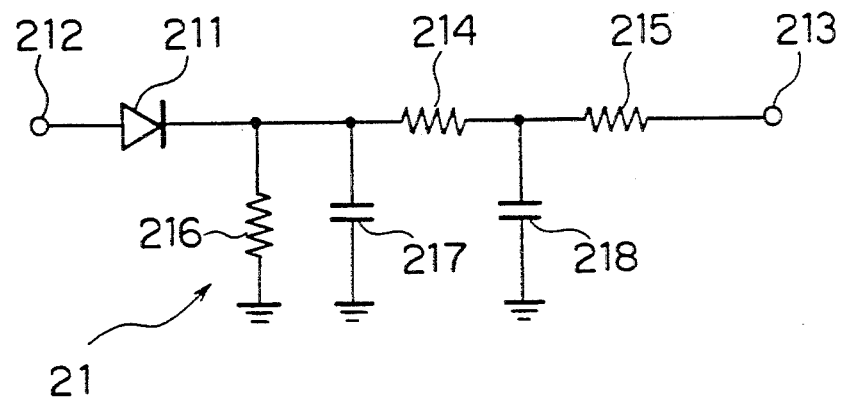
FIG. 5 is a circuit diagram of an output oscillation detector for use in the device illustrated in FIG. 1.

Turning to FIG. 5, the output oscillation detector 21 will be described more in detail. The output oscillation detector 21 comprises a diode 211 having an envelope signal input terminal 212. An intermediate resistor 214 and an output resistor 215 are connected in series between the diode 211 and a detection signal output terminal 213. An input resistor 216 and a capacitor 217 are connected in parallel between ground and a point of connection between the diode 211 and the intermediate resistor 214. A capacitor 218 is connected between ground and a point of connection between the intermediate resistor 214 and the output resistor 215.

The envelope signal is supplied through the terminal 212 to the diode 211. Supplied with the envelope signal, the diode 211 produces, as a pulse envelope signal, a half of the envelope signal that is a positive signal. The input resistor 216, the intermediate resistor 214, the input resistor 215, and capacitors 217 and 218 smooth the pulse envelope signal to produce the detection signal. The detection signal is delivered to the output terminal 213.

Turning back to FIG. 1, a failure monitor 22 is connected to the output terminal 213 (FIG. 5) of the output oscillation detector 21. The failure monitor 22 produces a fault signal when the detection signal is found faulty in the manner which will presently be described.

Figure 6:
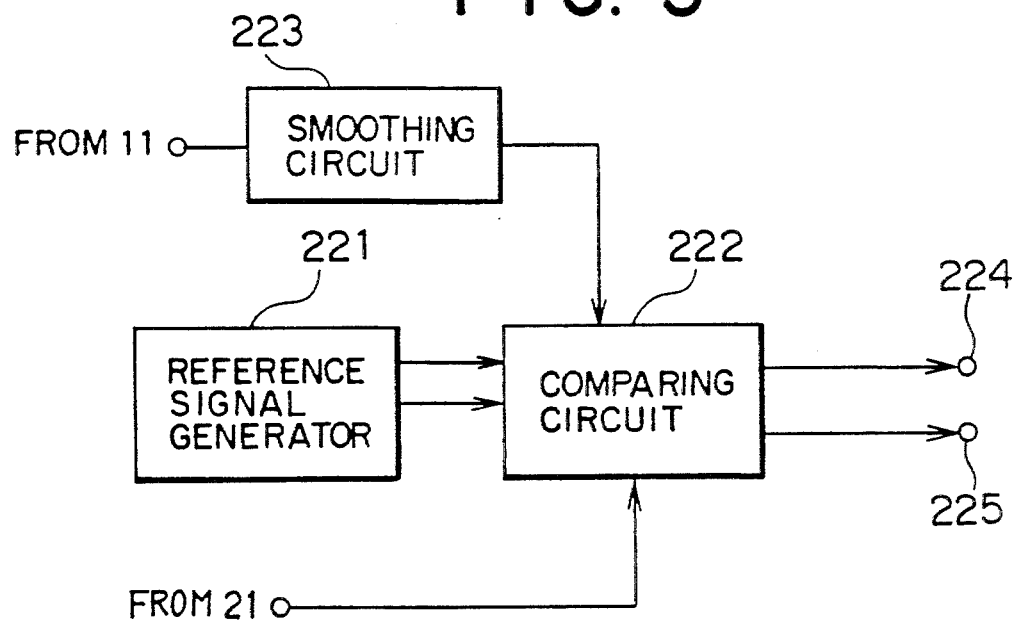
FIG. 6 is a block diagram of a failure monitor for use in the device illustrated in FIG. 1.

Turning to FIG. 6, the failure monitor 22 will be described more in detail. Briefly, the failure monitor 22 is operable in response to the detection signal of a d.c. level and the oscillation signal to judge whether or not a failure occurs. More specifically, the failure monitor 22 comprises a reference signal generator 221 for generating first and second reference voltages determined for the detection signal and the oscillation signal, respectively, and a comparing circuit 222 connected to the reference signal generator 221. The comparing circuit 222 is supplied with the first and the second reference voltages from the reference signal generator 221 on one hand. In addition, the comparing circuit 222 is supplied with the detection signal from the output oscillation detector 21 (FIG. 1) directly and with the oscillation signal from the oscillator 11 through a smoothing circuit 223 which may be similar to that illustrated in FIG. 5. In this connection, the oscillation signal is sent to the comparing circuit 222 as a smoothed signal of a d.c. level.

Under the circumstances, the illustrated comparing circuit 222 compares the detection signal and the smoothed signal with the first and the second reference voltages, respectively. When the level of the detection signal is lower than the first reference voltage, the comparing circuit 222 sends a first fault signal through a first output terminal 224 to the failure announcer 23 (FIG. 1). On the other hand, when the level of the smoothed signal is lower than the second reference voltage, the comparing circuit 222 sends a second fault signal through a second output terminal 225 to both the failure announcer 23 and the processor 20.

The failure indicator 23 produces alarm signals in response to the first and the second fault signals. For example, when the failure indicator 23 comprises a buzzer, the first and the second fault signals can be distinguished from each other by ringing the buzzer one time and twice in response to the first and the second fault signals, respectively. On the other hand, the processor 20 informs an upper device, such as a host computer, of occurrence of the second fault signal through an interface (not shown).

Turning back to FIG. 1, the failure announcer 23 is connected to the failure monitor 22. The failure announcer 23 announces a failure of the coordinate indicator 13 in response to the fault signal. The failure announcer 23 may typically be an alarm bell.

The controller 19 is connected to the oscillation generator 11, the scanning circuits 142 and 143, the calculating circuit 18, and the processor 20.

Figure 7:
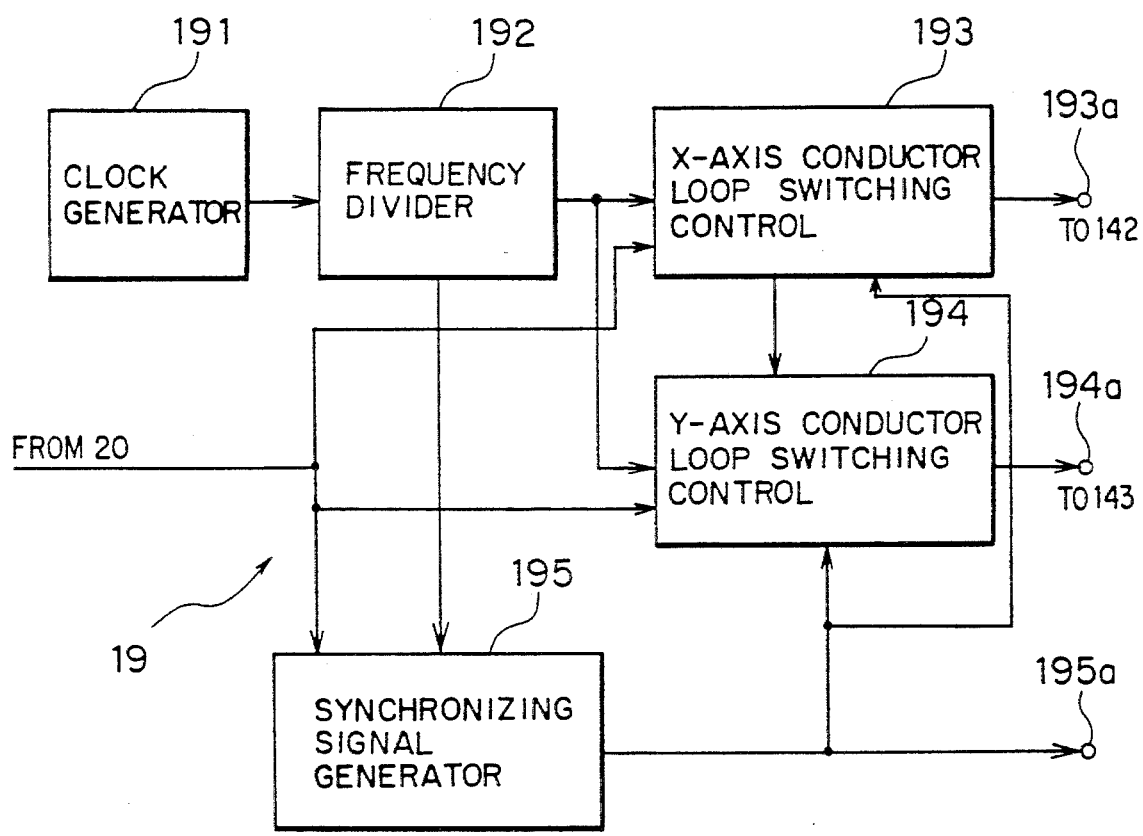
FIG. 7 is a block diagram of a controller for use in the device illustrated in FIG. 1.

Turning to FIG. 7, the controller 19 will be described more in detail. The controller 19 comprises a clock generator 191 for generating a clock signal. The clock signal has a frequency of, for example, 10 MHz. A frequency divider 192 is connected to the clock generator 191. The clock signal is supplied from the clock generator 191 to the frequency divider 192 for producing a frequency divided clock signal. The divided clock signal has a frequency of, for example, 100 Hz.

An x-axis conductor loop switching control 193 and a y-axis conductor loop switching control 194 are connected to the frequency divider 192. The frequency divided clock signal is supplied from the frequency divider 192 to the x-axis conductor loop switching control 193 and the y-axis conductor loop switching control 194. The x-axis conductor loop switching control 193 produces an x-axis control signal in response to the frequency divided clock signal and sends the control signal through an output terminal 193a to the first scanning circuit 142. The y-axis conductor loop switching control 194 produces a y-axis control signal in response to the divided clock signal and sends the control signal through an output terminal 194a to the second scanning circuit 143. The x-axis control signal and the y-axis control signal have a frequency of, for example, 100 Hz.

A synchronizing signal generator 195 is connected to the frequency divider 192. The divided clock signal is supplied from the frequency divider 192 to the synchronizing signal generator 195. The synchronizing signal generator 195 generates the origin pulse signal in synchronism with a selected one of the x-axis and the y-axis control signals to represent the origin of the coordinate surface 141. The origin pulse signal is supplied from the synchronizing signal generator 195 through an output terminal 195a to the calculating circuit 18.

More specifically, the x-axis conductor loop switching control 193, the y-axis conductor loop switching control 194, and the synchronizing signal generator 195 are enabled in response to an enable signal sent from the processor 20. Supplied with the enable signal, the synchronizing signal generator 195 produces an origin pulse representative of the origin of the coordinate surface at every scanning period during which each of the conductor loops of the x-axis and the y-axis is scanned one time. The origin pulse is delivered to the calculation circuit 18 and the x-axis and the y-axis conductor loop switching controls 193 and 194.

Now, let a scanning operation be started from the x-axis. In this case, the x-axis conductor loop switching control 193 starts to produce a sequence of switching pulse signals for driving the first scanning circuit 142 when receives the origin pulse. It is assumed that each of the x-axis and the y-axis conductor loops is equal in number to 100. Under the circumstances, the x-axis conductor loops are completely scanned on production of the switching pulse signals equal to 100. Accordingly, the x-axis conductor loop switching control 193 informs the y-axis conductor loop switching control 194 of completion of the scanning operation for the x-axis conductor loops when the switching pulse signals are counted to 100.

Responsive to such information of the completion, the y-axis conductor switching control 194 supplies a sequence of switching pulse signals to the second scanning circuit 143 in a manner similar to that described in conjuction with the x-axis conductor loop switching control 193. When the switching pulse signals are counted to 100, the y-axis conductor loops are completely scanned.

With this structure, both the x-axis and the y-axis conductor loops are totally scanned when the switching pulse signals are counted to 200. Therefore, each of the x-axis and the y-axis conductor loops comprises a counter which can count the switching pulse signals to 100. In addition, the origin pulse has a period equal to two hundreds of the switching pulse signals. From this fact, it is readily understood that the origin pulse is frequency multiplied in each of the x-axis and the y-axis conductor loop switching controls 193 and 194 by a frequency multiplier which has a factor of 200 and which can be readily structured by a simple logic circuit.

The processor 20 is connected to a display unit (not shown). The processor 20 makes the display unit display a location of the coordinate indicator 13 on the coordinate surface 141 when the processor 20 is supplied with the location signal. The processor 20 may make the display unit display a failure of the coordinate input device when the processor 20 is supplied with the second fault signal.

While this invention has thus far been described in conjuction with a single embodiment thereof, it will readily be possible for those skilled in the art to put this invention into practice in various other manners. For example, an oblique coordinate system can be used to define the coordinate surface 141. Furthermore, the coordinate surface 141 may be a curved surface on which a curvilinear coordinate system is defined.

What is claimed is:

1. A coordinate input device for use in indicating a location on a coordinate surface, said coordinate input device comprising:
    oscillation generating means for generating an oscillation signal;
    a capacitor connected to said oscillation generating means for producing said oscillation signal as an output oscillation signal;
    coordinate indicator which has a winding connected to said capacitor for inducing a magnetic field;
    a coordinate input unit which defines said coordinate surface, on which said coordinate indicator is movable, and which comprises a plurality of conductor loops, each conductor loop being for producing an electrical signal when magnetically coupled to said magnetic field;
    superposing means connected to said conductor loops and said capacitor for superposing said electrical signal on said output oscillation signal to produce a superposed signal;
    amplifying means connected to said superposing means for amplifying said superposed signal into an amplified signal;
    envelope detector means connected to said amplifying means for detecting an envelope of said amplified signal to produce an envelope signal indicative of said location;
    calculating means connected to said envelope detector means for using said envelope signal in calculating said location as a calculated location to produce a location signal representative of said calculated location;
    output oscillation detector means connected to said envelope detector means for detecting said output oscillation signal to produce a detection signal; and
    failure monitoring means connected to said output oscillation detector means for monitoring said detection signal to produce a fault signal when said detection signal is found faulty.

2. A coordinate input device as claimed in claim 1, said detection signal having a signal level, wherein said failure monitoring means comprises:
    reference signal producing means for producing a reference signal having a reference level;
    comparing means connected to said output oscillation detection means and said reference signal producing means for comparing said signal level with said reference level to produce said fault signal when said signal level is lower than said reference level.

3. A coordinate input device as claimed in claim 1, further comprising;
    failure announcing means connected to said failure monitoring means for announcing a failure of said coordinate indicator in response to said fault signal.

4. A coordinate input device as claimed in claim 3, said detection signal having a signal level, wherein said failure monitoring means comprises:
    reference signal producing means for producing a reference signal having a reference level;
    comparing means connected to said output oscillation detection means for comparing said signal level with said reference level to produce said fault signal when said signal level is lower than said reference level.

* * * * *